United States Patent
Joung et al.

(10) Patent No.: US 7,385,201 B1
(45) Date of Patent: Jun. 10, 2008

(54) STRIP PHOTON COUNTING DETECTOR FOR NUCLEAR MEDICINE

(75) Inventors: Jinhun Joung, Algunquin, IL (US); Samir Chowdhury, Chicago, IL (US); Douglas Jay Wagenaar, South Barrington, IL (US); Almos Elekes, Hoffman Estates, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 303 days.

(21) Appl. No.: 11/412,535

(22) Filed: Apr. 27, 2006

(51) Int. Cl.
*G01T 1/20* (2006.01)
*G01T 1/24* (2006.01)

(52) U.S. Cl. .............................. 250/370.11; 250/370.01

(58) Field of Classification Search ................ 250/252, 250/363.04, 370.01, 370.09, 370.11; 378/98.3, 378/98.8, 145
See application file for complete search history.

(56) References Cited

U.S. PATENT DOCUMENTS

| | | | | |
|---|---|---|---|---|
| 5,786,597 A | * | 7/1998 | Lingren et al. | 250/370.09 |
| 5,864,146 A | * | 1/1999 | Karellas | 250/581 |
| 6,031,892 A | * | 2/2000 | Karellas | 378/98.3 |
| 6,445,767 B1 | * | 9/2002 | Karellas | 378/98.8 |
| 7,115,872 B2 | * | 10/2006 | Bordynuik | 250/361 R |
| 2002/0057761 A1 | * | 5/2002 | Danielsson | 378/146 |

* cited by examiner

*Primary Examiner*—David P. Porta
*Assistant Examiner*—Mark R Gaworecki
(74) *Attorney, Agent, or Firm*—Peter L. Kendall

(57) ABSTRACT

A nuclear medicine imaging system is disclosed that includes a detector including a plurality of silicon strip sensor arrays surrounding a scintillator. In some embodiments, strip detectors can be provided that can lead to significant cost benefits as compared to existing detectors, such as existing nuclear detectors. The preferred embodiments may be applied in nuclear medical cameras, while other embodiments may be applied in other radiation applications, whether medical or non-medical applications.

20 Claims, 3 Drawing Sheets

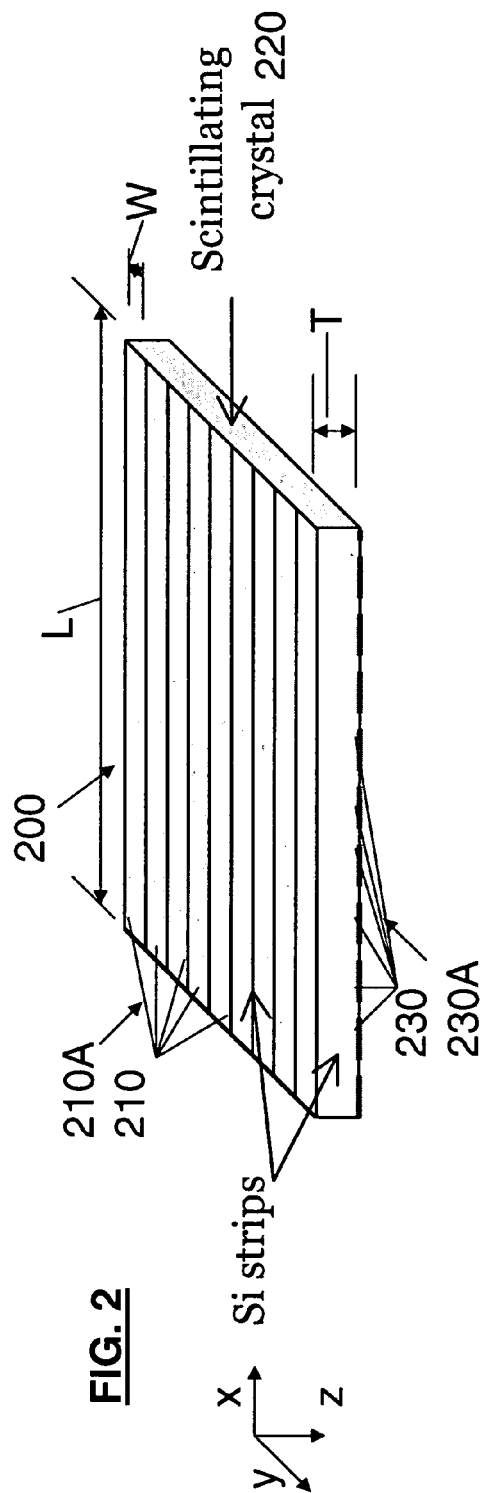
FIG. 2
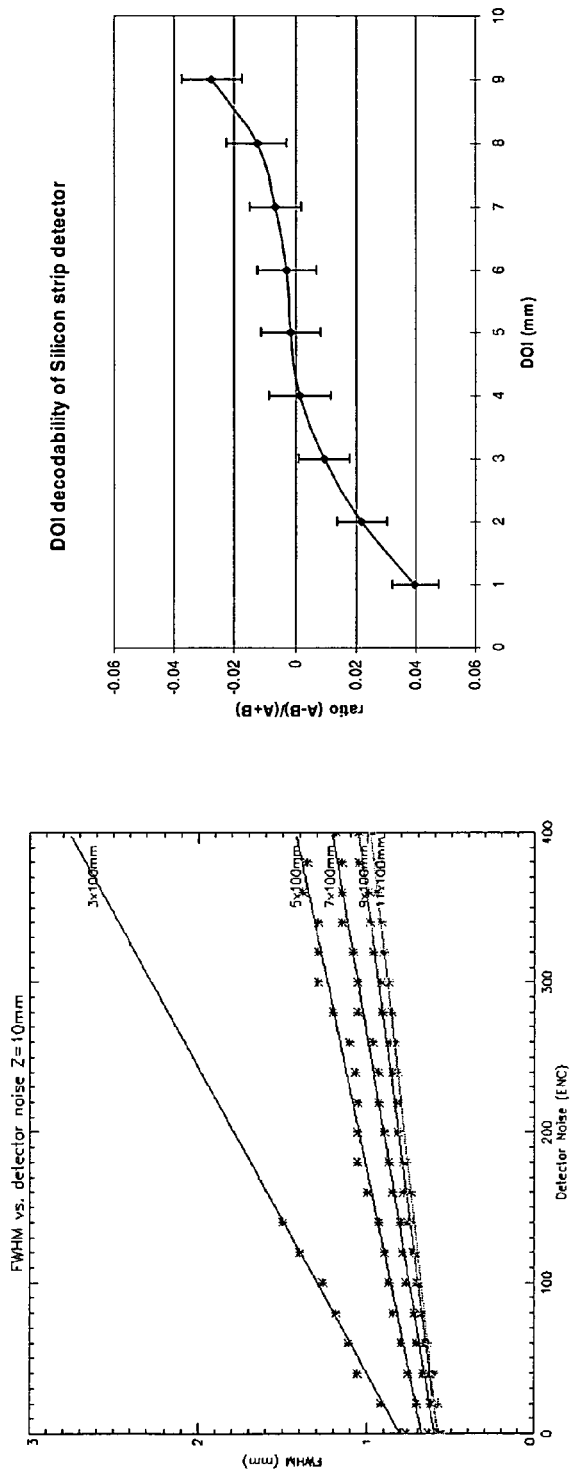
FIG. 4
FIG. 3

STRIP PHOTON COUNTING DETECTOR FOR NUCLEAR MEDICINE

BACKGROUND

1. Field of the Invention

The present invention relates to, inter alia, medical imaging systems, and, in particular, to detectors for gamma cameras of nuclear medicine imaging systems and/or the like. More particularly, some preferred embodiments of the invention relate to methods and apparatuses related to counting of photon detections nuclear medicine imaging systems.

2. Background Discussion

A variety of medical imaging systems are known. Some illustrative imaging systems include nuclear medical imaging systems (e.g., gamma cameras), computed tomography (CT or CAT) systems, magnetic resonance imaging (MRI) systems, positron-emission tomography (PET) systems, ultrasound systems and/or the like.

With respect to nuclear medical imaging systems, nuclear medicine is a unique medical specialty wherein radiation (e.g., gamma radiation) is used to acquire images that show, e.g., the function and/or anatomy of organs, bones and/or tissues of the body. Typically, radioactive compounds, called radiopharmaceuticals or tracers, are introduced into the body, either by injection or ingestion, and are attracted to specific organs, bones or tissues of interest. These radiopharmaceuticals produce gamma photon emissions that emanate from the body and are captured by a scintillation crystal, with which the photons interact to produce flashes of light or "events." These events can be detected by, e.g., an array of photodetectors, such as photomultiplier tubes, and their spatial locations or positions can be calculated and stored. In this manner, an image of an organ, tissue or the like under study can be created from the detection of the distribution of the radioisotopes in the body. Typically, one or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

FIG. 5 depicts components of a typical nuclear medical imaging system 100 (i.e., having a gamma camera or a scintillation camera) which includes a gantry 102 supporting one or more detectors 108 enclosed within a metal housing and movably supported proximate a patient 106 located on a patient support (e.g., pallet) 104. Typically, the positions of the detectors 108 can be changed to a variety of orientations to obtain images of a patient's body from various directions. In many instances, a data acquisition console 200 (e.g., with a user interface and/or display) is located proximate a patient during use for a technologist 107 to manipulate during data acquisition. In addition to the data acquisition console 200, images are often developed via a processing computer system which is operated at another image processing computer console including, e.g., an operator interface and a display, which may often be located in another room, to develop images. By way of example, the image acquisition data may, in some instances, be transmitted to the processing computer system after acquisition using the acquisition console.

Nuclear medicine imaging typically involves the assessment of a radionuclide distribution within a patient after the in vivo administration of radiopharmaceuticals. Imaging systems that assess radionuclide distribution include radiation detectors and acquisition electronics. Typically, the imaging systems detect x-ray or gamma ray photons derived from the administered radionuclides. Single photon emission imaging and coincidence imaging are two forms of nuclear medicine imaging that are currently in common use. In single photon emission imaging, the radionuclide itself directly emits the radiation to be assessed. For example, in Single Photon Emission Computed Tomography (SPECT), γ-emitting radionuclides such as $^{99m}$Tc, $^{123}$I, $^{67}$Ga and $^{111}$In may be part of the administered radiopharmaceutical.

Detectors used in such single photon emission imaging often use collimators placed between the patient and the gamma ray camera of the detector. In general, the collimators help to eliminate substantially all photons but those photons traveling in a desired direction. For example, a parallel hole collimator helps to eliminate photons traveling in all directions except those almost perpendicular to the surface of the detector. The energy of emitted photons as well as their location of origin may then be accumulated until a satisfactory image is obtained.

Coincidence imaging helps to eliminate the need for such a collimator by relying on the detection of two photons at different detectors at nearly the same time. An example of coincidence imaging in current clinical use is Positron Emission Tomography (PET).

Typically, radiation detectors used in nuclear medicine imaging need to absorb x- or gamma-ray photons in an energy range typically between 1 keV and several MeV. These imaging photons are the photons either directly emitted or resulting from radionuclides within a patient. In order to stop imaging photons of these energies with a collimator in SPECT imaging, a material with a high density and a high atomic number (Z) is necessary. Lead is the most common material used for collimators, but other materials such as, e.g., tungsten may also be used.

Typically, in radiology, detectors used clinically only integrate the energy deposited by a beam. However, a new generation of detectors for digital radiography and computed tomography (CT) can obtain extra information by counting individual photons and measuring their energy.

With respect to scintillators, a variety of scintillators are known. For example, scintillators include, e.g., continuous single slab, pixilated and/or columnar grow crystals. As for radionuclide imagers with pixilated radiation detector elements, typically cadmium zinc telluride ("CZT") crystals have recently been developed. In these pixilated radionuclide imagers, the intrinsic spatial resolution is defined by the size of the individual pixilated detector elements, rather than the separation between collimator holes. See, e.g., U.S. Pat. No. 6,838,672, assigned to the present assignee, the entire disclosure of which is incorporated herein by reference. With respect to the use of CZT as a solid state (i.e., semiconductor) detector material, as a single photon detector, CZT is typically superior to NaI in several performance parameters. Among other things, the count rate capability for CZT detectors is virtually unlimited as compared to a typical scintillator crystal, because each pixel (or picture element) of the CZT material can act as an independent detector. Thus, unlike a typical scintillator crystal, in which two events occurring very close in time and spatial location will produce overlapping light output, two gamma photons arriving at exactly the same time in adjacent pixels of a CZT detector could be independently detected and measured accurately with respect to energy, given an optimum electronic circuitry design.

A few background references, the entire disclosures of which are incorporated herein by reference as though recited herein in full, are listed below for reference.

1) T. E. Peterson, D. W. Wilson, H. H. Barrett, *A Small-Animal Imaging System Based on Silicon Strip Detectors*, IEEE medical imaging conference, pp. 533-536 (2002).
2) E. Beuville, et. al., *High Resolution X-Ray Imaging Using a Silicon Strip Detector*, IEEE trans. Nucl. Sci. Vol. 45 No 5, pp. 3059 (1998).
3) M. G. Scannavini, et. al., *Design of a Small Laboratory Compton Camera for the Imaging of Positron Emitters*, IEEE Trans. Nucl. Sci. Vol. 47 no. 3, pp. 1155-1162 (June 2000).

While a variety of background technologies exist, there is a continued need in the art for improved systems and methods.

SUMMARY OF THE PREFERRED EMBODIMENTS

The preferred embodiments of the present invention can significantly improve upon existing methods and/or apparatuses.

In some embodiments, a nuclear medicine imaging system is disclosed that includes, among other things, detector including a plurality of silicon strip sensor arrays surrounding a scintillator. In some embodiments, strip detectors can be provided that can lead to significant cost benefits as compared to existing detectors, such as, e.g., existing nuclear detectors. The preferred embodiments may be applied in nuclear medical cameras, while other embodiments may be applied in other radiation applications, whether medical or non-medical applications.

According to some embodiments of the invention, a device for nuclear medical imaging is provided that includes: a silicon strip detector optically coupled with a scintillator.

According to some embodiments of the invention, a strip photon counting detector for nuclear medical imaging is provided that includes: orthogonal strip arrays sandwiching opposite faces of a scintillator. Preferably, the arrays include silicon strips.

According to some embodiments of the invention, a nuclear medicine imaging system is provided that includes a detector including a plurality of silicon strip sensor arrays and a scintillator. Preferably, the silicon strip sensor arrays include small cells configured to operate in a photon-counting mode. And, preferably, the silicon strip sensor arrays include small cells configured to operate in a photon-counting mode with Geiger mode avalanche amplification. And, preferably, the strip sensor arrays are orientated substantially orthogonal to each other to provide gamma ray interaction in an x-y coordinate. And, preferably, a depth of interaction is estimated by a ratio between signals from a first of the strip arrays and a second of the strip arrays. And, preferably, the scintillator is sandwiched between a set of the strip arrays. In some embodiments, the scintillator has a continuous single slab; while in some embodiments, the scintillator is pixilated, while in some embodiments the scintillator has columnar grow crystals.

According to some embodiments of the invention, a method for detecting electromagnetic waves in a nuclear medical imaging system is performed that includes: emitting electromagnetic waves; and detecting the electromagnetic waves with a detector including a plurality of silicon strip sensor arrays surrounding a scintillator. Preferably, the emitting electromagnetic waves include emitting gamma rays. And, in some embodiments, the method further includes that silicon strip sensor arrays are orientated substantially orthogonal to each other and estimating gamma ray position in an x-y coordinate based on such orientation, and estimating a depth of interaction by a ratio between signals from a first of the silicon strip arrays and a second of the silicon strip arrays.

The above and/or other embodiments, aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention, as well as further objects, features and advantages of the preferred embodiments will be more fully understood with reference to the following detailed description of the preferred embodiments, when taken in conjunction with the accompanying drawings, wherein:

FIG. 2 shows a conceptual illustration of a strip detector according to some illustrative embodiments;

FIG. 3 shows an illustrative Cramer Rao lower bound test as a function of strip size and electronic noise;

FIG. 4 shows an illustrative depth of interaction decoding prediction, where A=the sum of the two highest output signals from the entrance side strips, B=the sum of the two highest output signals from the exit side strips, strip size=10×100 mm, and detector size=300×300 mm.

DETAILED DESCRIPTION OF THE EXEMPLARY EMBODIMENTS

Figure 1B:
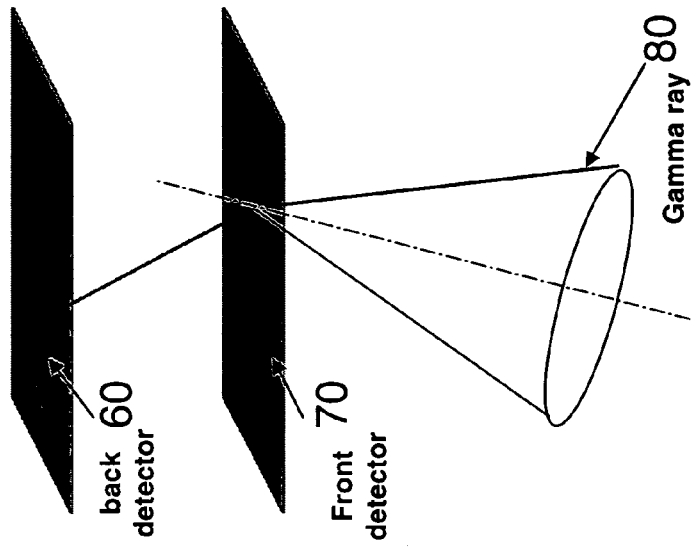
FIG. 1(A) illustrates imaging principles of digital radiography and FIG. 1(B) illustrates a Compton camera using strip detectors.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Introduction to the Preferred Embodiments

A silicon strip detector has a very attractive photo-sensor geometry that provides several advantages including, e.g., one or more of the following: compact electronics; lower cost; additional event-positioning information; and/or improved imaging performance. A silicon strip detector has been used occasionally in high-energy physics and in the field of digital radiography where the detectors, so called edge-on silicon detectors, are vertically oriented so that x-rays enter through two sets of slit collimators. See. e.g., T. E. Peterson, D. W. Wilson, H. H. Barrett, *A Small-Animal Imaging System Based on Silicon Strip Detectors*, IEEE medical imaging conference, pp. 533-536 (2002), the entire contents of which is incorporated by reference. An imaging principle of a digital radiography system is illustrated in FIG. 1(A), which illustrates x-rays 10 passing through an upper collimator 20, a scanned object 30, a lower collimator 40, and into a vertically positioned strip detector 50.

Figure 1A:
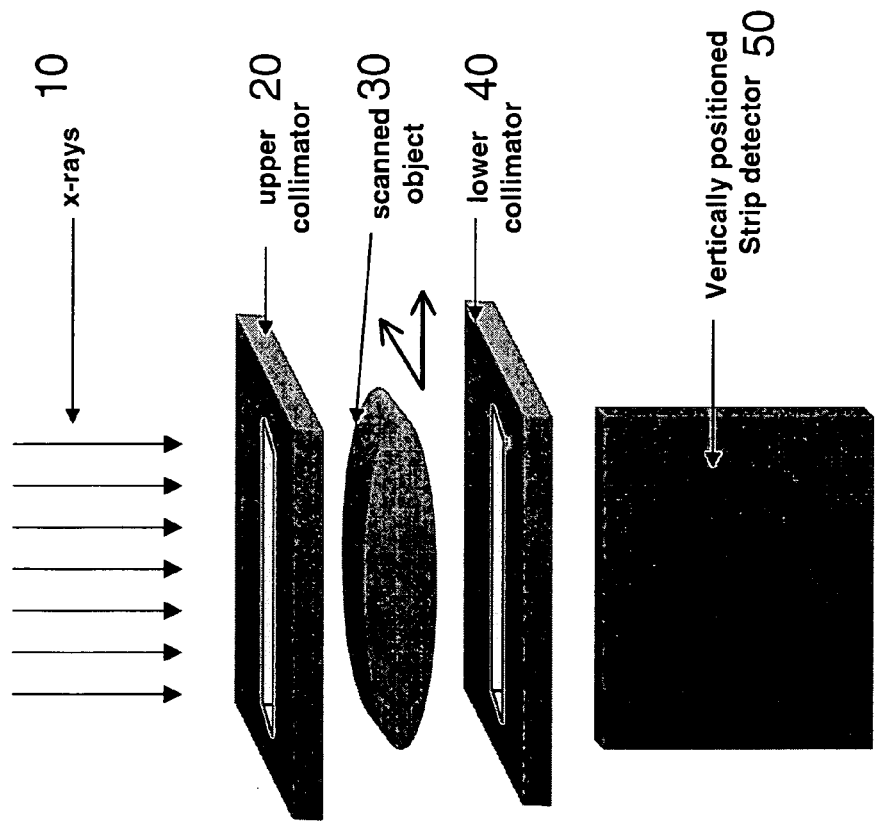
Figure 5:
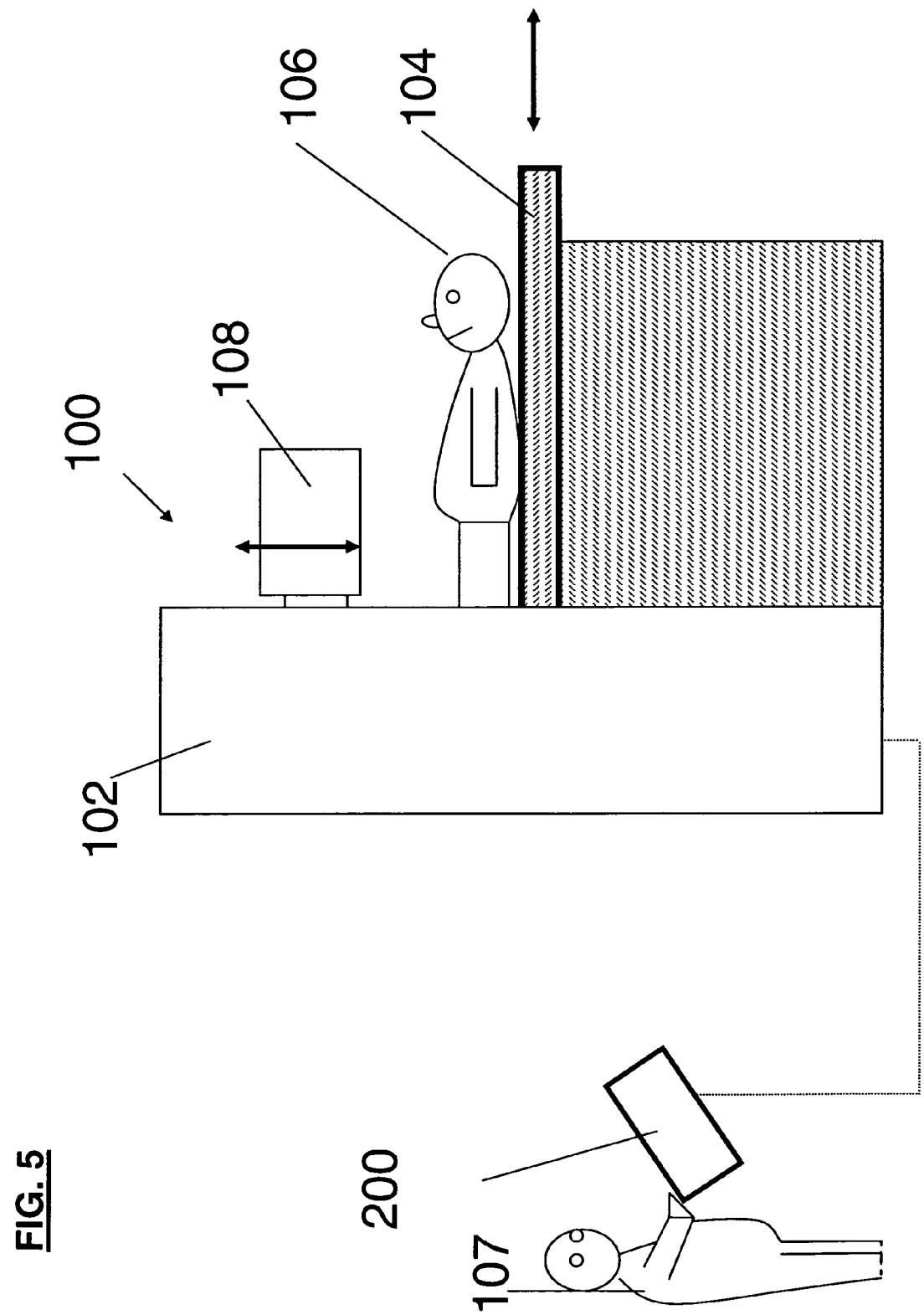
FIG. 5 is a schematic diagram of an illustrative and non-limiting nuclear medical imaging system in which some embodiments of the invention may be employed.

In addition, in the nuclear medicine application, a double-sided strip detector has been incorporated into a Compton-scatter imaging device, such as, e.g., illustrated in FIG. 1(B) having a back detector 60 and a front detector 70. See, e.g., E. Beuville, et. al., *High Resolution X-Ray Imaging Using a Silicon Strip Detector*, IEEE trans. Nucl. Sci. Vol. 45 No 5, pp. 3059 (1998). In addition, a small animal imaging system designed for detection of the low-energy (27-35 keV) photons have been introduced. See, e.g., M. G. Scannavini, et al., *Design of a Small Laboratory Compton Camera for the Imaging of Positron Emitters*, IEEE Trans. Nucl. Sci. Vol. 47 no. 3, pp. 1155-1162 (June 2000), the entire contents of which is incorporated by reference. The x-y coordinates of the photon interaction in the detector is determined by the front and back of strips that are orthogonal to one another.

In the background art, x-rays or low energy gamma rays directly interact within the silicon substrate and produce electron-hole pairs. In this direct-conversion mode, the signal collected at the anode is much greater than the leakage current of the silicon sensor so that the relatively large area strip sensor can be employed without disturbance from leakage current.

However, the probability of photoelectric absorption of gamma rays in silicon material is so low that it does not provide enough detection efficiency for gamma energies used in typical clinical nuclear medicine (e.g., a few tens of keV to positron imaging—e.g., 511 keV). This is one reason why scintillation material is typically integrated into a photo-sensor in most nuclear medicine detectors. However, the signal from the scintillator is relatively low so that extremely low noise and high gain photo-sensors, such as, e.g., photomultiplier tubes (PMT), and amplifier electronics are essential to detect visible photons produced by scintillation materials. Accordingly, a typical PIN photodiode is inadequate for the strip detectors with scintillators due to the high leakage current of long strip silicon sensors.

In the preferred embodiments of the invention, a novel nuclear medicine detector is designed that provides three-dimensional gamma interaction positions with relatively fewer electronic channels, lower costs, and/or improved performance. In the preferred embodiments, the detector includes a scintillator (such as, e.g., a single slab scintillator, a pixilated scintillator, a columnar structure scintillator and/or the like) sandwiched between two silicon strip arrays in which the direction of the strips are substantially orthogonal to each other to determine gamma interaction location in x-y coordinates. As described in further detail below, FIG. 2 shows an illustrative embodiment employing an array 210A of Si strips 210 on a first face of a scintillating crystal 220, and an array 230A of Si strips 230 on a second face of the scintillating crystal 220.

Previously, a strip detector optically coupled with a scintillator had not been attempted. Among other things, noise issues mentioned limited the ability for the same. In some preferred embodiments, any appropriate silicon sensor technology that allows for the manufacture a long strip detector with low noise can be utilized, such as, e.g., new technologies such as, e.g., Geiger mode avalanche photon counting technologies that facilitate the manufacture a long strip detector with extremely low noise, such as to facilitate employment of such a detector in the field of nuclear medicine. See, e.g., W. J. Kindt, *Geiger Mode Avalanche Photodiode Arrays, For Spatially Resolved Single Photon Counting*, Delft University Press (November 1999)(ISBN: 90-407-1845-8), the entire disclosure of which is incorporated herein by reference. Among other things, in some implementation examples, the present inventors have employed aspects herein within a new photon counting silicon sensor.

The Preferred Embodiments

The preferred embodiments of the present invention generally relate to nuclear medicine, and to systems for obtaining nuclear medicine images of a patient's body organs of interest. In particular, the preferred embodiments of the present invention relate to a novel detector configuration for nuclear medical imaging systems that are capable of performing either positron emission tomography (PET) or planar and single photon emission computed tomography (SPECT).

As discussed above, FIG. 2 depicts an illustrative embodiment of the invention. As shown, two silicon strip detector arrays 210A and 230A are optically coupled with a scintillator 220 as shown in FIG. 2. In some embodiments, the scintillator 220 can be a continuous single slab, a pixilated scintillator and/or a columnar scintillator structure made of appropriate material such as CsI, NaI, LSO, LaBr3, LaCl3 and/or the like.

In various embodiments, the shapes and sizes of the detector 200 and the strips 210 and/or 230 can be selected depending on the detector and/or system performance requirements. In preferred embodiments, a gamma ray interaction in an x-y coordinate direction, such as, e.g., shown in FIG. 1(A), is determined by the set of strip arrays 210A and 230A that are mounted on both sides of the scintillator 220. Preferably, the depth of interaction (e.g., the z-directional position) is determined by a ratio between the total of top and bottom array energy and/or timing signals. In some embodiments, the positioning estimator can be either linear, such as Anger logic, or non-linear (e.g., statistics or neural network based, estimators).

FIG. 3 shows an illustrative example having an expected spatial resolution based on Cramer-Rao lower bound calculation (see equation (1) below) as a function of strip width W and length L (see, e.g., reference numerals referenced in FIG. 2). In this illustrative and non-limiting example, the length L of a strip (e.g., 210 and 230) is set to 10 cm long and the thickness T of the scintillator 220 is set to 1 cm. In addition, in this illustrative example, two strip sensor arrays 210A and 230A and a single slab of scintillator 220 are optically coupled without any light guide between them. In other embodiments, a variety of optical couplings can be employed. In this context, equation #1 can be written as follows.

$$\text{var}_\theta(W(x)) \geq \frac{\left(\frac{d}{d\theta}E_\theta[W(x)]\right)^2}{E_\theta\left[\left(\frac{\partial}{\partial\theta}\log f(x|\theta)\right)^2\right]} \quad \text{Equation \#1}$$

The results depicted in FIG. 3 show that the optimum strip width W is about 1 cm when about a 1 cm thick scintillator 220 is employed in some examples. Considering, for example, a noise equivalent count (NEC) of a silicon photon counting device is less than 100 $e^-$, the expected spatial resolution of the preferred embodiments of the invention can be, e.g., less than about a 1 mm full width a half maximum (FWHM).

In some preferred embodiments, a linear and/or non-linear estimator can also estimate a depth of interaction (DOI). In this regard, any appropriate depth of interaction estimation techniques can be employed. By way of example, FIG. 4 shows an expected DOI resolution using a simple linear estimator according to some illustrative examples.

Illustrative System Features

In some illustrative and non-limiting embodiments, an illustrative system can be provided that includes one or more, or in some preferred embodiments all, of the following component features:

- A detector that includes a set of silicon strip sensors and a scintillator;
- A silicon strip sensor that includes small cells that operate in a photon-counting mode with, e.g., Geiger mode avalanche amplification;
- A strip pitch, width and length that are subject to be optimized based on detector specifications and/or performance expectations;
- An orientation of the strip sensors (e.g., strip sensor arrays) that is substantially orthogonal to each other to provide gamma ray interaction in an x-y coordinate;
- A depth of interaction (DOI) that can be estimated by, e.g., a ratio between the total signal from a top strip array 210 and a bottom strip array 230;
- A scintillator 220 that is preferably sandwiched by a set of strip arrays 210A and 230A with or without light guides;
- Any appropriate configuration of a scintillator, such as, e.g., including a continuous single slab, a pixilated scintillator and/or columnar grow crystals; and/or
- A scintillator made of any appropriate materials, such as, e.g., being made with CsI, NaI, LSO, LaBr3, LaCl3 and/or other appropriate materials as would be apparent to those in the art based on this disclosure.

While illustrative embodiments of the invention have been described herein, the present invention is not limited to the various exemplary embodiments described herein, but includes any and all embodiments having equivalent elements, modifications, omissions, combinations (for example, various aspects in different embodiments can be combined together when appropriate in various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A device for nuclear medical imaging, comprising: a silicon strip detector optically coupled with a scintillator.

2. A strip photon counting detector for nuclear medical imaging, comprising: orthogonal strip arrays sandwiching opposite faces of a scintillator.

3. The strip photon counting detector of claim 2, wherein said arrays include silicon strips.

4. A nuclear medicine imaging system, comprising: a detector including a plurality of silicon strip sensor arrays coupled with a scintillator.

5. The system of claim 4, wherein said silicon strip sensor arrays include small cells configured to operate in a photon-counting mode.

6. The system of claim 5, wherein said silicon strip sensor arrays include small cells configured to operate in a photon-counting mode with Geiger mode avalanche amplification.

7. The system of claim 4, wherein said strip sensor arrays are orientated substantially orthogonal to each other to provide gamma ray interaction in an x-y coordinate.

8. The system of claim 4, wherein a depth of interaction is estimated by a ratio between signals from a first of said strip arrays and a second of said strip arrays.

9. The system of claim 4, wherein said scintillator is sandwiched between a set of said strip arrays.

10. The system of claim 9, wherein said scintillator is sandwiched between said set of said strip arrays without light guides.

11. The system of claim 9, wherein said scintillator is sandwiched between said set of said strip arrays with light guides.

12. The system of claim 4, wherein said scintillator has a continuous single slab.

13. The system of claim 4, wherein said scintillator is pixilated.

14. The system of claim 4, wherein said scintillator has columnar grow crystals.

15. The system of claim 4, wherein said scintillator is made with material from the group consisting of CsI, NaI, LSO, LaBr3 and LaCl3.

16. The system of claim 4, wherein said system is configured such that an x-y coordinate direction is determined by a set of strip arrays mounted on both sides of the scintillator.

17. The system of claim 4, wherein said system is configured such that a depth of interaction is determined by a ratio between a set of strip arrays energy and/or timing signals.

18. A method for detecting photons in a nuclear medical imaging system, comprising the steps of placing a source of photon emission in proximity to a detector including a plurality of silicon strip sensor arrays surrounding a scintillator, and detecting said photons using said detector.

19. The method of claim 18, wherein said emitting source includes emitting gamma rays.

20. The method of claim 19, further including having said silicon strip sensor arrays orientated substantially orthogonal to each other and estimating gamma ray position in an x-y coordinate based on such orientation, and estimating a depth of interaction by a ratio between signals from a first of said silicon strip arrays and a second of said silicon strip arrays.

* * * * *